United States Patent
Chan et al.

(10) Patent No.: US 11,210,494 B2
(45) Date of Patent: Dec. 28, 2021

(54) METHOD AND APPARATUS FOR SEGMENTING CELLULAR IMAGE

(71) Applicant: The Chinese University of Hong Kong, Hong Kong (CN)

(72) Inventors: Yiu Leung Chan, Hong Kong (CN); Mingpeng Zhao, Guangzhou (CN); Han Hui Li, Yingde (CN); Tin Chiu Li, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 134 days.

(21) Appl. No.: 16/660,037

(22) Filed: Oct. 22, 2019

(65) Prior Publication Data

US 2020/0125818 A1 Apr. 23, 2020

Related U.S. Application Data (60) Provisional application No. 62/749,349, filed on Oct. 23, 2018.

(51) Int. Cl.
*G06K 9/62* (2006.01)
*G06K 9/00* (2006.01)

(52) U.S. Cl.
CPC ......... *G06K 9/0014* (2013.01); *G06K 9/6256* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,989,475 B2* | 3/2015 | Wong | ................ | C12N 5/0604 |
| | | | | 382/133 |
| 2014/0297199 A1* | 10/2014 | Osten | ................ | G01N 33/5014 |
| | | | | 702/19 |
| 2019/0325621 A1* | 10/2019 | Wang | ................ | A61B 6/037 |
| 2019/0392580 A1* | 12/2019 | Kapil | ................ | G06K 9/00147 |
| 2020/0184637 A1* | 6/2020 | El-Zehiry | ........... | G06K 9/628 |

FOREIGN PATENT DOCUMENTS

| CN | 109614921 A | * | 4/2019 |
|---|---|---|---|
| CN | 109726644 A | * | 5/2019 |
| WO | WO 2017/132674 | | 8/2017 |

OTHER PUBLICATIONS

EP Search Report in European Appln. No. 19204290.1, dated Mar. 17, 2020, 9 pages.
Kheradmand et al., "Inner cell mass segmentation in human hmc embryo images using fully convolutional network," 2017 IEEE International Conference on Image Processing (ICIP), Sep. 17, 2017, 1752-1756.

(Continued)

*Primary Examiner* — Tsung Yin Tsai
(74) *Attorney, Agent, or Firm* — Fish & Richardson P.C.

(57) ABSTRACT

Method and apparatus for segmenting a cellular image are disclosed. A specific embodiment of the method includes: acquiring a cellular image; enhancing the cellular image using a generative adversarial network to obtain an enhanced cellular image; and segmenting the enhanced cellular image using a hierarchical fully convolutional network for image segmentation to obtain cytoplasm and zona pellucida areas in the cellular image.

11 Claims, 4 Drawing Sheets

(56) References Cited

OTHER PUBLICATIONS

Mahmood et al., "Deep adversarial training for multi-organ nuclei segmentation in histopathology images," IEEE transactions on medical imaging, Jul. 5, 2019, 1-10.

Rad et al., "A hybrid approach for multiple blastomeres identification in early human embryo images," Computers in biology and medicine, Oct. 1, 2018, 101:100-11.

Rad et al., "Multi-resolutional ensemble of stacked dilated u-net for inner cell mass segmentation in human embryonic images," 2018 25th IEEE International Conference on Image Processing (ICIP), Oct. 7, 2018, 3518-3522.

Shrivastava et al., "Learning from simulated and unsupervised images through adversarial training," Proceedings of the IEEE conference on computer vision and pattern recognition, 2017, 2107-2116.

\* cited by examiner

METHOD AND APPARATUS FOR SEGMENTING CELLULAR IMAGE

CROSS-REFERENCE TO RELATED APPLICATIONS

This application claims priority to U.S. provisional application 62/749,349, filed on Oct. 23, 2018, titled "Method And Apparatus for Segmenting Cellular Image," the entire disclosure of which is hereby incorporated by reference.

TECHNICAL FIELD

The present disclosure relates to the field of computer technology, specifically to the field of image processing, and more specifically to a method and apparatus for segmenting a cellular image.

BACKGROUND

In in vitro fertilisation (IVF), only a minority of the in vitro generated embryos have the ability to implant and to give a viable pregnancy, probably because of intrinsic characteristics of the zygotes. To increase the probability of implantation, the transfer of a single embryo with high implantation potential would be the ideal strategy. Identifying embryos with high implantation potential remains a challenge in IVF and different approaches have been adopted for that purpose. The most widely supported strategy to choose viable embryos is to rely on the grade of the embryos at the time of embryo transfer. Furthermore, legal constraints in some countries prevent the use of approaches involving embryo selection, identification of potentially viable embryos there is thus limited either to oocytes prior to fertilisation or to pronuclear stage zygotes.

As human embryos follow a specific developmental timeline, during which milestones are reached in a coordinated sequence that are typified by characteristic morphological features, features of the zygotes that focus on morphology and dynamics of embryo development have been proposed as indicators of embryo viability. Zygote scoring systems have been developed, all having in common a subjective microscopic observation of oocyte or zygotes. Generally, the selection of the good quality embryos are influenced, among others, by the pronuclear morphology, appearance of cytoplasm and zona pellucida. For example, the embryos with an irregularly thick zona pellucida may have lower implantation rate than embryos with uniform thickness of zona pellucida.

In spite of relations between the zona pellucida thickness and IVF success rates, this parameter is not often used in selection of the best quality embryos for transfer, due to practical difficulties in distinguishing the boundaries of zona pellucida under the microscope.

However, the traditional methods are unsatisfactory for zona pellucida and nucleus segmentation due to their rough and ambiguous edges. Furthermore, it is very time consuming for embryologist to examine the zona pellucida one by one. For example, morphological pattern outside pronuclei is hard to standardize. Other changes in zygote may be difficult or cumbersome for human to perceive.

SUMMARY

According to an aspect of the present disclosure there is provided a method for segmenting a cellular image, the method comprising: acquiring a cellular image; enhancing the cellular image using a generative adversarial network to obtain an enhanced cellular image; and segmenting the enhanced cellular image using a hierarchical fully convolutional network for image segmentation to obtain cytoplasm and zona pellucida areas in the cellular image.

According to another aspect of the present disclosure there is provided an apparatus for segmenting a cellular image, the apparatus comprising: at least one processor; and a memory storing instructions, the instructions when executed by the at least one processor, cause the at least one processor to perform operations, the operations comprising: acquiring a cellular image; enhancing the cellular image using a generative adversarial network to obtain an enhanced cellular image; and segmenting the enhanced cellular image using a hierarchical fully convolutional network for image segmentation to obtain cytoplasm and zona pellucida areas in the cellular image.

According to yet another aspect of the present disclosure there is provided a non-transitory computer storage medium storing a computer program, the computer program when executed by one or more processors, causes the one or more processors to perform operations, the operations comprising: acquiring a cellular image; enhancing the cellular image using a generative adversarial network to obtain an enhanced cellular image; and segmenting the enhanced cellular image using a hierarchical fully convolutional network for image segmentation to obtain cytoplasm and zona pellucida areas in the cellular image.

BRIEF DESCRIPTION OF THE DRAWINGS

These and other features of the disclosure will become more apparent from the following description in which reference is made to the appended drawings wherein.

DETAILED DESCRIPTION OF PREFERRED EMBODIMENTS

In view of the deficiency of existing methods for distinguishing the morphological features in oocytes or zygotes, the present disclosure provides an improved method for cellular image segmentation.

Reference will now be made in detail to some specific embodiments of the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims. In the following description, numerous specific details are set forth in order to provide a thorough understanding of the present disclosure. The present disclosure may be practiced without some or all of these specific details. In other instances, well-known process operations have not been described in detail in order not to unnecessarily obscure the present disclosure.

Oocyte or zygote recognition relates to enhancement and segmentation techniques of the oocyte or zygote images. The image enhancement is to denoise and highlight the edge of an area of interest in the images of the oocyte or zygote, while the image segmentation is to recognize the areas of cytoplasm, zona pellucida, or nucleus (for zygote). Both the image enhancement and segmentation techniques facilitate further artificial processing of the oocyte or zygote.

The image enhancement involves image smoothing and edge enhancement. The image smoothing is to remove the high-frequency information of images which can be achieved by methods such as Gaussian filter, Median filter, and Bilateral filter. On the other hand, the edge enhancement requires detecting the areas of high-frequency and large gradient magnitudes, and the traditional solutions thereof are based on differential operation such as Sobel operator, Laplacian operator, and Canny operator.

Image segmentation methods include supervised methods and unsupervised methods. The unsupervised methods do not require the manually labelled training data. Instead, the heuristic knowledge for the initial conditions of segmentation is used, such as threshold method, cluster method, region growing method, and level set method. On the other hand, the supervised methods require images with labeled target areas to form a training dataset. The conventional supervised methods are based on graph-cut theory, including Markov Random field and Conditional Random field.

The present disclosure describes modification of neural networks for cellular image processing, in particular, for oocyte or zygote image processing.

Technical solutions disclosed in the present disclosure enhances cellular images, for example, oocyte and zygote images and self-adaptively segment the cytoplasm, zona pellucida, and nucleus (for the zygote, only) areas. The present disclosure further enhances and segments the cellular images for a detailed quantitative analysis on morphology assessment.

Figure 1:
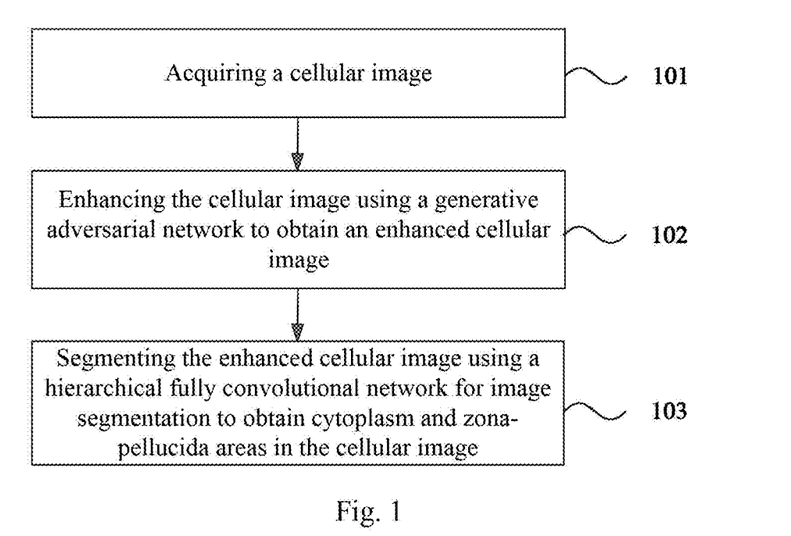
FIG. 1 illustrates a flowchart of a method for segmenting a cellular image according to an embodiment of the present disclosure.

With reference to FIG. 1, a flow of an embodiment of the method for segmenting a cellular image according to the present disclosure is illustrated. The method for segmenting a cellular image includes the following steps 101-103.

Step 101, acquiring a cellular image.

In an embodiment, the cellular image may be one of an oocyte image or a zygote image.

Step 102, enhancing the cellular image using a generative adversarial network to obtain an enhanced cellular image.

Figure 2:
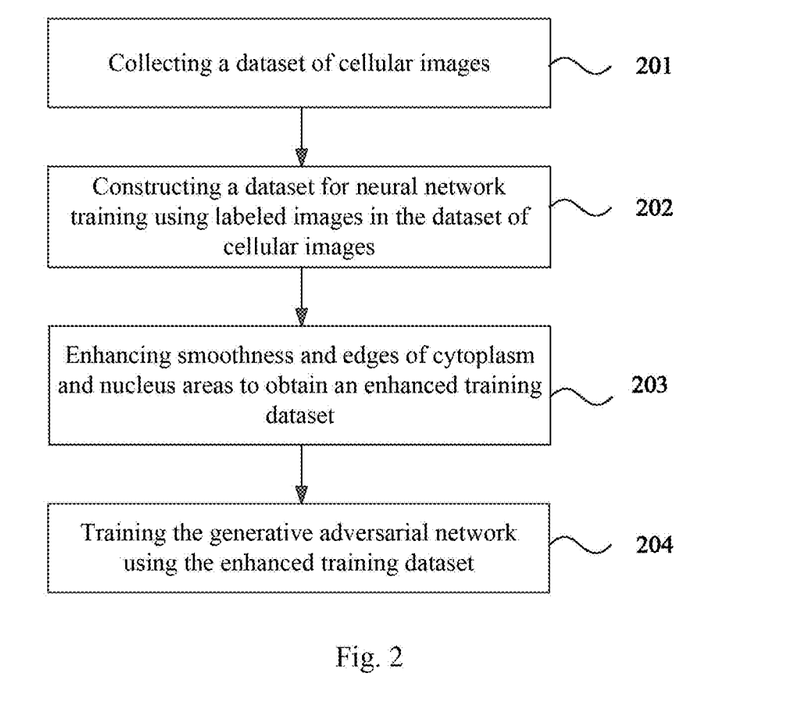
FIG. 2 illustrates a flowchart of a method for training a generative adversarial network according to an embodiment of the present disclosure.

In an embodiment, the generative adversarial network may be trained as illustrated in FIG. 2 and include the following steps 201-204.

Step 201, collecting a dataset of cellular images, for example, oocyte or zygote images.

In an embodiment, the cellular images, for example, oocyte or zygote images may be derived from time-lapse imaging. These images are fixed in a uniform scale and converted into grey images.

Specifically, a dataset containing N images of oocyte or zygote is marked as $X=\{X_1, X_2, \ldots X_N\}$. For any image $X_n$, it is resized to a H×W, where H and W denote the height and width of the image, respectively. For RGB images, they are transferred to the grey images by using the weighted mean method.

Step 202, constructing a dataset for neural network training using labeled images in the dataset of cellular images, for example, oocyte or zygote images.

In an embodiment, the labeled images may include cytoplasm and zona pellucida areas for oocyte images, or the labeled images may include cytoplasm, zona pellucida, and nucleus areas for zygote images. The labeled areas may be closed, that is, the areas are labeled with closed boundaries.

In an embodiment, each pixel of the image is categorized by fulfilling the area inside a certain boundary (cytoplasm, zona pellucida or nucleus). For example, $Z_n \in \{0,1,2,3\}^{H \times W}$ is set as the labels of the pixel category, where 0 represents the area of the background, 1 represents the nucleus area, 2 represents the cytoplasm area and 3 represents the zona pellucida area.

Step 203, enhancing smoothness and edges of cytoplasm and nucleus areas to obtain an enhanced training dataset.

In an embodiment, for nucleus and cytoplasm areas, the smoothness and edges thereof are enhanced to gain the enhanced training dataset.

In an embodiment, the bilateral filter with different smoothing coefficients is used to smooth and denoise the input cellular images, for example, oocyte or zygote images. Optimal smoothing results are chosen from the result set by the experts.

Specifically, the following bilateral filter algorithm is used for smoothing.

$$BF(I_p) = \frac{1}{\Phi} \sum G(\|p-q\|, \sigma_s) G(\|I_p - I_q\|, \sigma_I) I_q$$

$I_p$ represents the grey value of the pixel p.

$\Phi$ represents the normalization term.

G represents the Gaussian kernel decided by smoothing parameters $\sigma_S$ of spatial constraint and $\sigma_I$ of intensity constraint. $\sigma_S$ and $\sigma_I$ are uniformly selected values in the range of $[\lambda_a, \lambda_b]$ and $[\lambda_c, \lambda_d]$ respectively by the default setting, then images are obtained from the bilateral filter algorithm. From the generated enhanced images with respective to $X_n$, K optimal results are selected as an instance in the dataset of images of H×W×K for subsequent processing. The enhanced training dataset is marked as $Y=\{Y_1, Y_2, \ldots, Y_K\}$.

Step 204, training the generative adversarial network using the enhanced training dataset.

In an embodiment, for an input oocyte or zygote image, the generative adversarial network is used to generate several enhanced images. The structure of the generative adversarial network here is, for example, but not limited to, cycleGAN trained by the Adam algorithm.

During the training the generative adversarial network, an input image is a single oocyte or zygote image while a corresponding output image is in high resolution and enhanced.

Specifically, the generative adversarial network is trained for the mapping relation between the original image dataset X to the enhanced image dataset Y ($F_G: X \rightarrow Y$). This training is completed by one of the generative adversarial network model cycleGAN.

Suppose $F_G:Y \rightarrow X$ is an inverse transformation for image enhancement, the objective function for optimization in this training is defined as $L_{GAN}(X,Y,D_Y,F_G)+L_{GAN}(Y,X,D_X,F_{G'})+L_{cycle}(X,Y,F_G,F_{G'})$, where $D_X(X)$ denotes a classifier judging whether the image X is the raw image, while $D_Y(X)$ is the classifier judging whether the image Y is the enhanced image.

The terms $$L_{GAN}(Y, X, D_Y, F_G) = \underset{Y}{E}[\log D_Y(Y)] + \underset{X}{E}[\log(1 - D_Y(F_G(X)))]$$

and $$L_{GAN}(Y, X, D_X, F_{G'}) = \underset{X}{E}[\log D_X(X)] + \underset{Y}{E}[\log(1 - D_X(F_{G'}(Y)))]$$

are used to approximate the distribution of the original image X and the enhanced image Y while the term $$L_{cycle} = (X, Y, F_G, F_{G'}) = \underset{X}{E}[\|F_{G'}(F_G(X)) - X\|_1] + \underset{Y}{E}[\|F_G(F_{G'}(Y)) - Y\|_1]$$

is used to increase the reversibility of the mapping. The objective function discussed above is optimized by the Adam algorithm.

Figure 3:
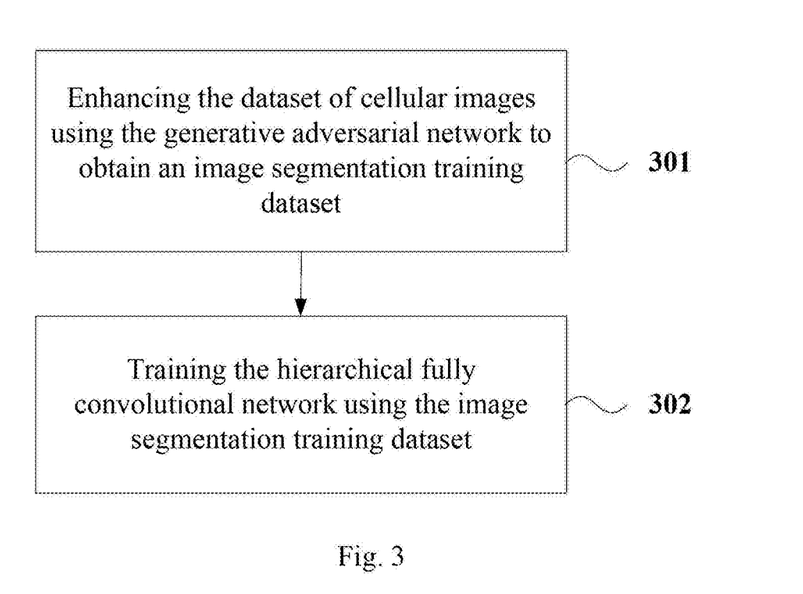
FIG. 3 illustrates a flowchart of a method for training a hierarchical fully convolutional network according to an embodiment of the present disclosure.

In an embodiment, the hierarchical fully convolutional network may be trained as illustrated in FIG. 3 and include the following steps 301-302.

Step 301, enhancing the dataset of cellular images, for example, oocyte or zygote images using the generative adversarial network to obtain an image segmentation training dataset.

Step 302, training the hierarchical fully convolutional network using the image segmentation training dataset.

In this network, the input is the enhanced images while the output is each pixel's probabilities of belonging to the background, cytoplasm, zona pellucida and nucleus (for zygote) areas of the whole image. The main trait of this network is its hierarchical proceeding. It first predicts the cytoplasm area, then segments the zona pellucida area outside the cytoplasm area and the nucleus area (for zygote) inside the cytoplasm area respectively.

Specifically, the hierarchical fully convolutional network is trained for the mapping relation of enhanced image dataset Y to their pixel categorized dataset Z ($F_D:Y \rightarrow Z$).

The cytoplasm area is fulfilled two traits. One of the two traits is that, the edge of the cytoplasm area is more obvious than the other two areas of interest (nucleus and zona pellucida). The other one of the two traits is that, the nucleus is inside the cytoplasm while the zona pellucida is outside the cytoplasm due to the biological nature. Therefore, this hierarchical fully convolutional network first trains the segmentation of the cytoplasm.

The loss function of the cytoplasm segmentation is defined as the cross-entropy $L_s(F_D(Y), Z) = -\Sigma p(Z) \log q(F_D(Y))$, where $p(Z)$ presents the probability distribution of Z and $F_D(Y)$ represents the probability distribution of mapping results. The cytoplasm segmentation training is realized by minimizing $L_s(F_D(Y),Z)$ through the Adam algorithm. After that, the nucleus area inside the segmented cytoplasm area and zona pellucida area outside the segmented cytoplasm area are constrained. The zona pellucida area and nucleus area (for zygote) may be segmented by the loss function introduced above in the constrained condition.

Step 103, segmenting the enhanced cellular image using a hierarchical fully convolutional network for image segmentation to obtain cytoplasm and zona pellucida areas in the cellular image.

In an embodiment, when the cellular image is the oocyte image, cytoplasm and zona pellucida areas in the cellular image may be obtained by segmenting the enhanced cellular image using the hierarchical fully convolutional network. When the cellular image is the zygote image, cytoplasm, zona pellucida and nucleus areas in the cellular image may be obtained by segmenting the enhanced cellular image using the hierarchical fully convolutional network. The enhanced cellular image is in high resolution and enhanced.

Figure 4A:
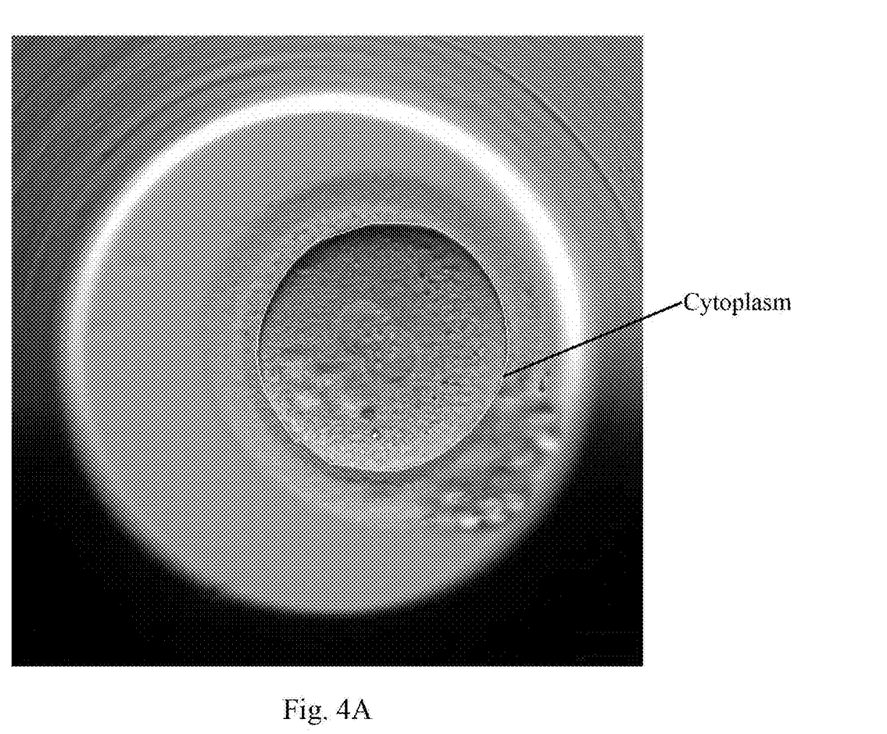
FIG. 4A illustrates a segmented cytoplasm area according to an embodiment of the present disclosure.
Figure 4B:
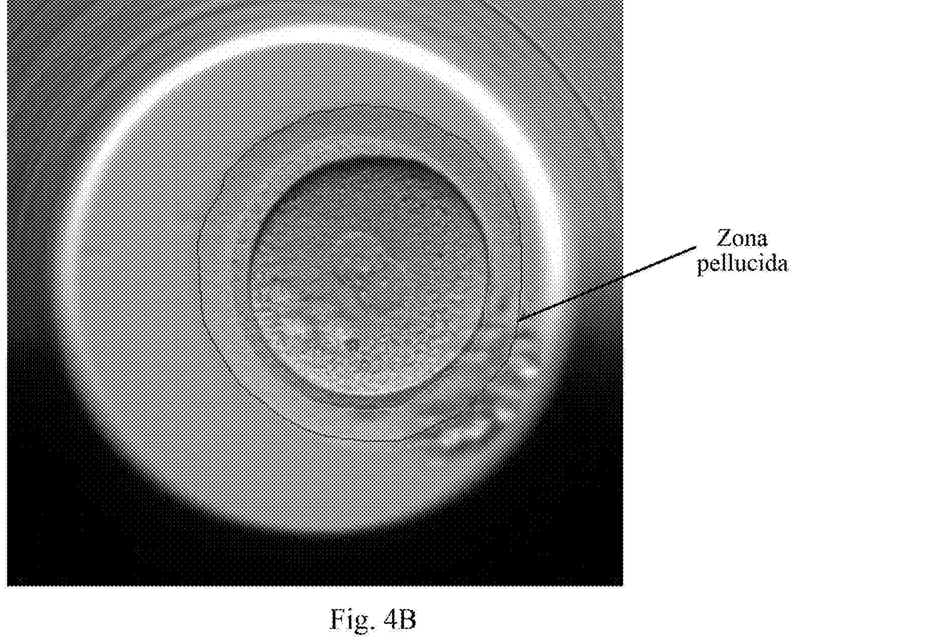
FIG. 4B illustrates a segmented zona pellucida area according to an embodiment of the present disclosure.
Figure 4C:
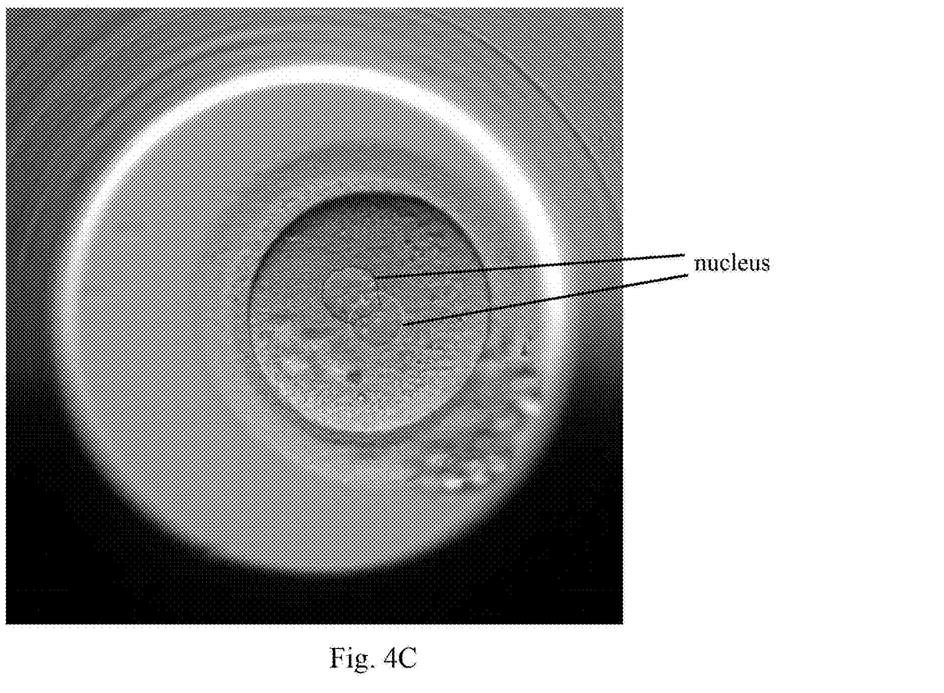
FIG. 4C illustrates a segmented nucleus area according to an embodiment of the present disclosure.

In an embodiment, the cytoplasm area is first segmented, next the zona pellucida area outside the cytoplasm area is segmented, then the nucleus area inside the cytoplasm area is segmented. As an example, FIG. 4A illustrates a segmented cytoplasm area with a closed boundary according to an embodiment of the present disclosure, FIG. 4B illustrates a segmented zona pellucida area according to an embodiment of the present disclosure, FIG. 4C illustrates a segmented nucleus area according to an embodiment of the present disclosure.

1080 cellular images from 24 oocytes or zygotes originating from 5 patients were analysed in accordance to one embodiment of the present disclosure. Specifically, 1080 cellular images were labelled for cytoplasm recognition, 597 cellular images were labelled for pronucleus recognition, and 672 cellular images were labelled for zona pellucida recognition.

The cytoplasm recognition results were as follows:

| Trial | Training Instances | Training Accuracy | Test Instances | Test Accuracy |
|---|---|---|---|---|
| 1 | 933 | 97.28 ± 1.26% | 285 | 97.21 ± 1.12% |
| 2 | 987 | 97.06 ± 1.37% | 231 | 96.64 ± 1.34% |
| 3 | 975 | 97.09 ± 1.45% | 243 | 97.34 ± 1.56% |
| 4 | 995 | 97.47 ± 1.67% | 223 | 96.28 ± 1.78% |
| 5 | 982 | 97.24 ± 1.89% | 236 | 97.57 ± 1.34% |
| Average | 974.4 | 97.23 ± 1.43% | 243.6 | 97.01 ± 1.33% |

The pronucleus recognition results were as follows:

| Trial | Training Instances | Training Accuracy | Test Instances | Test Accuracy |
|---|---|---|---|---|
| 1 | 586 | 77.84 ± 8.96% | 96 | 78.68 ± 12.25% |
| 2 | 543 | 78.63 ± 8.45% | 139 | 70.74 ± 13.30% |
| 3 | 461 | 73.33 ± 10.57% | 221 | 77.05 ± 7.19% |
| 4 | 542 | 80.44 ± 7.38% | 140 | 66.83 ± 13.61% |
| 5 | 596 | 79.12 ± 8.50% | 86 | 71.50 ± 10.35% |
| Average | 545.6 | 77.87 ± 8.77% | 136.4 | 72.96 ± 11.34% |

The zona pellucida recognition results were as follows:

| Trial | Training Instances | Training Accuracy | Test Instances | Test Accuracy |
|---|---|---|---|---|
| 1 | 235 | 73.16 ± 6.09% | 173 | 69.48 ± 5.45% |
| 2 | 342 | 76.21 ± 5.71% | 66 | 71.67 ± 6.04% |
| 3 | 335 | 76.61 ± 5.63% | 73 | 68.28 ± 6.30% |

-continued

| Trial | Training Instances | Training Accuracy | Test Instances | Test Accuracy |
|---|---|---|---|---|
| 4 | 342 | 76.50 ± 5.29% | 66 | 76.67 ± 5.55% |
| 5 | 378 | 76.97 ± 5.33% | 30 | 67.52 ± 5.91% |
| Average | 326.4 | 75.89 ± 5.61% | 81.6 | 70.72 ± 5.85% |

As can be seen from the above disclosure, the traditional image segmentation method is susceptible to the noises of cellular images, for example, oocyte or zygote images and the edges of the nucleus and zona pellucida areas in those images are ambiguous, which is difficult for the traditional method to deal with. In contrast, the present disclosure enhances images by the generative adversarial network first. As a result, those images are de-noised and the pixel gradient of the edge of the area of interest is increased. This procedure decreases the difficulty of succeeding segmentation procedure. The hierarchical fully convolutional network exploits the spatial relations among different to-be-segmented areas, that is, the zona pellucida is outside the cytoplasm while the nucleus is inside the cytoplasm. The cytoplasm area is first segmented, then the zona pellucida and nucleus (for zygote) areas are segmented. This procedure reduces the interference of different areas and increases the segmentation accuracy.

Figure 5:
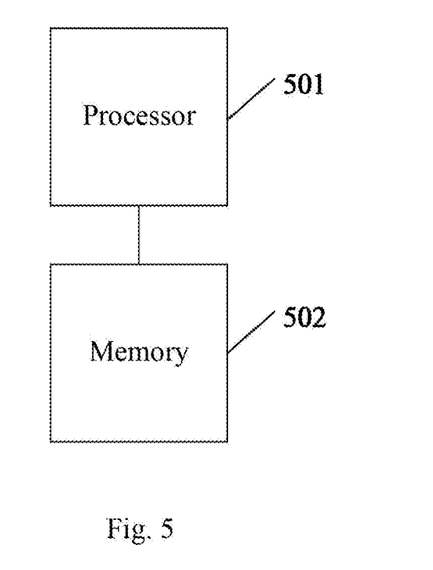
FIG. 5 illustrates a schematic structural diagram of an apparatus for segmenting a cellular image according to an embodiment of the present disclosure.

With further reference to FIG. 5, as an implementation to the method shown in the above figures, the present disclosure provides an embodiment of an apparatus for segmenting a cellular image. The apparatus embodiment corresponds to the method embodiment shown in FIGS. 1 to 3, and the apparatus may specifically be applied to various electronic devices.

As shown in FIG. 5, the apparatus for segmenting a cellular image of the present embodiment includes: at least one processor 501; and a memory 502 storing instructions, the instructions when executed by the at least one processor, cause the at least one processor to perform operations, the operations comprising: acquiring a cellular image; enhancing the cellular image using a generative adversarial network to obtain an enhanced cellular image; and segmenting the enhanced cellular image using a hierarchical fully convolutional network for image segmentation to obtain cytoplasm and zona pellucida areas in the cellular image.

In some alternative implementations of the present embodiment, the cellular image is one of an oocyte image or a zygote image.

In some alternative implementations of the present embodiment, when the cellular image is the zygote image, the segmenting the enhanced cellular image using a hierarchical fully convolutional network to obtain cytoplasm and zona pellucida areas in the cellular image comprises: segmenting the enhanced cellular image using the hierarchical fully convolutional network to obtain cytoplasm, zona pellucida and nucleus areas in the cellular image.

In some alternative implementations of the present embodiment, the cytoplasm area is first segmented, next the zona pellucida area outside the cytoplasm area is segmented, then the nucleus area inside the cytoplasm area is segmented.

In some alternative implementations of the present embodiment, the generative adversarial network is trained by: collecting a dataset of cellular images; constructing a dataset for neural network training using labeled images in the dataset of cellular images, the labeled images including cytoplasm and zona pellucida areas for oocyte images, or the labeled images including cytoplasm, zona pellucida, and nucleus areas for zygote images; enhancing smoothness and edges of cytoplasm and nucleus areas to obtain an enhanced training dataset; and training the generative adversarial network using the enhanced training dataset.

In some alternative implementations of the present embodiment, the hierarchical fully convolutional network is trained by: enhancing the dataset of cellular images using the generative adversarial network to obtain an image segmentation training dataset; and training the hierarchical fully convolutional network using the image segmentation training dataset.

In some alternative implementations of the present embodiment, during the training the generative adversarial network, an input image is a single oocyte or zygote image while a corresponding output image is in high resolution and enhanced.

In some alternative implementations of the present embodiment, the enhanced cellular image is in high resolution and enhanced.

According to the method and apparatus for segmenting a cellular image provided by the present disclosure, two types of neural networks are used. One is the generative adversarial network for enhancing cellular images, for example, oocyte or zygote images; the other one is the hierarchical fully convolutional network for segmenting enhanced cellular images, for example, oocyte or zygote images. The generative adversarial network is able to denoise and highlight the area of interest in the cellular images, for example, oocyte or zygote images, consequently reducing the difficulty for consequent procedures. The hierarchical fully convolutional network has constrained the spatial relations among the areas of interest during segmentation, and hence increases the accuracy of segmentation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is further understood that the use of relational terms such as first and second, and the like, if any, are used solely to distinguish one from another entity, item, or action without necessarily requiring or implying any actual such relationship or order between such entities, items or actions.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Figure 6:
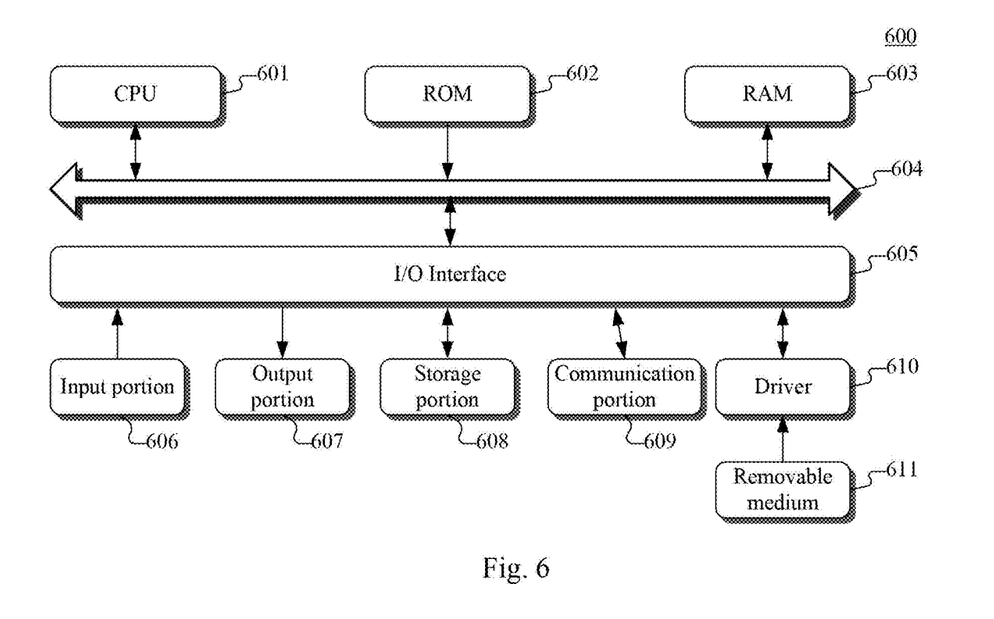
FIG. 6 illustrates is a schematic structural diagram of a computer system adapted to implement an electronic device of embodiments of the present disclosure.

Referring to FIG. 6, a structural schematic diagram of a computer system 600 adapted to implement an electronic device of embodiments of the present disclosure is shown. The electronic device may include the apparatus for segmenting a cellular image of the present disclosure. The electronic device shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

In another aspect, the present disclosure further provides a non-transitory computer storage medium storing a computer program, the computer program when executed by one or more processors, causes the one or more processors to perform operations, the operations comprising: acquiring a cellular image; enhancing the cellular image using a generative adversarial network to obtain an enhanced cellular image; and segmenting the enhanced cellular image using a hierarchical fully convolutional network for image segmentation to obtain cytoplasm and zona pellucida areas in the cellular image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for segmenting a cellular image, the method comprising:

acquiring a cellular image;

enhancing the cellular image using a generative adversarial network to obtain an enhanced cellular image, wherein the cellular image is a zygote image; and segmenting the enhanced cellular image using a hierarchical fully convolutional network for image segmentation to obtain cytoplasm, zona pellucida and nucleus areas in the cellular image, wherein the cytoplasm area is first segmented, next the zona pellucida area outside the cytoplasm area is segmented, then the nucleus area inside the cytoplasm area is segmented.

2. The method according to claim 1, wherein the generative adversarial network is trained by:

collecting a dataset of cellular images;

constructing a dataset for neural network training using labeled images in the dataset of cellular images, the labeled images including cytoplasm and zona pellucida areas for oocyte images, or the labeled images including cytoplasm, zona pellucida, and nucleus areas for zygote images;

enhancing smoothness and edges of cytoplasm and nucleus areas to obtain an enhanced training dataset; and training the generative adversarial network using the enhanced training dataset.

3. The method according to claim 2, wherein the hierarchical fully convolutional network is trained by:

enhancing the dataset of cellular images using the generative adversarial network to obtain an image segmentation training dataset; and training the hierarchical fully convolutional network using the image segmentation training dataset.

4. The method according to claim 2, wherein during the training the generative adversarial network, an input image is a single oocyte or zygote image while a corresponding output image is in high resolution and enhanced.

5. The method according to claim 1, wherein the enhanced cellular image is in high resolution and enhanced.

6. An apparatus for segmenting a cellular image, the apparatus comprising:

at least one processor; and a memory storing instructions, the instructions when executed by the at least one processor, cause the at least one processor to perform operations, the operations comprising:

acquiring a cellular image;

enhancing the cellular image using a generative adversarial network to obtain an enhanced cellular image, wherein the cellular image is a zygote image; and segmenting the enhanced cellular image using a hierarchical fully convolutional network for image segmentation to obtain cytoplasm, zona pellucida and nucleus areas in the cellular image, wherein the cytoplasm area is first segmented, next the zona pellucida area outside the cytoplasm area is segmented, then the nucleus area inside the cytoplasm area is segmented.

7. The apparatus according to claim 6, wherein the generative adversarial network is trained by:

collecting a dataset of cellular images;

constructing a dataset for neural network training using labeled images in the dataset of cellular images, the labeled images including cytoplasm and zona pellucida areas for oocyte images, or the labeled images including cytoplasm, zona pellucida, and nucleus areas for zygote images;

enhancing smoothness and edges of cytoplasm and nucleus areas to obtain an enhanced training dataset; and training the generative adversarial network using the enhanced training dataset.

8. The apparatus according to claim 7, wherein the hierarchical fully convolutional network is trained by:

enhancing the dataset of cellular images using the generative adversarial network to obtain an image segmentation training dataset; and training the hierarchical fully convolutional network using the image segmentation training dataset.

9. The apparatus according to claim 7, wherein during the training the generative adversarial network, an input image is a single oocyte or zygote image while a corresponding output image is in high resolution and enhanced.

10. The apparatus according to claim 6, wherein the enhanced cellular image is in high resolution and enhanced.

11. A non-transitory computer storage medium storing a computer program, the computer program when executed by one or more processors, causes the one or more processors to perform operations, the operations comprising:

acquiring a cellular image;

enhancing the cellular image using a generative adversarial network to obtain an enhanced cellular image, wherein the cellular image is a zygote image; and segmenting the enhanced cellular image using a hierarchical fully convolutional network for image segmentation to obtain cytoplasm, zona pellucida and nucleus areas in the cellular image, wherein the cytoplasm area is first segmented, next the zona pellucida area outside the cytoplasm area is segmented, then the nucleus area inside the cytoplasm area is segmented.

\* \* \* \* \*